(12) United States Patent
Kanesaka

(10) Patent No.: US 6,343,473 B1
(45) Date of Patent: Feb. 5, 2002

(54) HYBRID SUPERCHARGED ENGINE

(75) Inventor: Hiroshi Kanesaka, Kawasaki (JP)

(73) Assignee: Kanesaka Technical Institute Ltd, Kanagawa (JP)

(*) Notice: Subject to any disclaimer, the term of this patent is extended or adjusted under 35 U.S.C. 154(b) by 0 days.

(21) Appl. No.: 09/331,369

(22) PCT Filed: Dec. 24, 1997

(86) PCT No.: PCT/JP97/04768

§ 371 Date: Jun. 21, 1999

§ 102(e) Date: Jun. 21, 1999

(87) PCT Pub. No.: WO98/29647

PCT Pub. Date: Jul. 9, 1998

(30) Foreign Application Priority Data

Dec. 27, 1996 (JP) .............................. 8-358847
Nov. 30, 1997 (JP) .............................. 9-345816

(51) Int. Cl.$^7$ ............................................. F02B 37/04
(52) U.S. Cl. ....................................................... 60/609
(58) Field of Search ................................... 60/609, 610

(56) References Cited

U.S. PATENT DOCUMENTS 4,903,488 A * 2/1990 Shibata ..................... 60/609
5,875,766 A * 3/1999 Ozawa ...................... 60/609

FOREIGN PATENT DOCUMENTS

| JP | 61-181834 | | 11/1986 | |
|----|-----------|---|---------|--------|
| JP | 62-142824 | * | 6/1987  | 60/609 |
| JP | 1-208520  |   | 8/1989  |        |
| JP | 08028292  |   | 1/1996  |        |
| JP | 08177597  |   | 7/1996  |        |
| JP | 08189370  |   | 7/1996  |        |
| JP | 08210144  |   | 8/1996  |        |

* cited by examiner

Primary Examiner—Michael Koczo
(74) Attorney, Agent, or Firm—Jones, Tullar & Cooper, P.C.

(57) ABSTRACT

In a hybrid supercharging engine comprising a turbo charger TC becoming a maximum capacity at a speed higher than a maximum torque rotating speed of an engine and a volume type supercharger SC provided in series to the TC, wherein a two step supercharging is performed while controlling the SC in such a manner as to keep a supply air amount constant without relation to an engine speed, it is possible not only to set a low BSFC but also to set twice or more BMEP of the TC supercharging engine. Further, since a supply air amount to an engine is increased by supercharging mainly by means of an SC at a time of a low speed so as to accelerate the TC, a turbo lag is prevented from generating and a performance at a time of a steady operation can be obtained even at a time of a rapid acceleration from a low speed. Still further, the SC is effectively functions even at a time of starting so as to increase a compressing pressure and a temperature of an engine so that a high ratio output engine which must be made a low compression ratio can be easily started. Accordingly, the engine can be made compact, light weight and inexpensive, and an exhaust of $No_x$ can be reduced without sacrificing a reliability of an engine.

16 Claims, 6 Drawing Sheets

HYBRID SUPERCHARGED ENGINE

BACKGROUND OF THE INVENTION

1. Field of the Invention

The present invention relates to a hybrid supercharging engine in which a supercharger having a power source other an exhaust gas is arranged in a supercharging system of an engine, particularly in a diesel engine (hereinafter referred to to as an "engine"), the system comprising a turbocharger and a supercharger in a series to the turbocharger, thereby supercharging the engine by two steps, and to an improvement of Japanese Patent Application No. 8-358847.

2. Description of the Related Art

A supercharging system using a turbocharger for the purpose of increasing the output of a diesel engine has been popular in Europe and America where a lot of flatlands are included; however, it has not been currently popular in Japan, where a lot of mountains and slopes are included, for the following reasons.

The turbocharger mentioned above is a speed type and has the characteristics shown in FIG. 2; however, there are the following disadvantages.

(a) When the turbocharger is mounted in a vehicle engine which requires a low speed torque in accordance with a characteristic of increasing a pressure ratio (hereinafter referred to as pressure) in proportion to a rotating speed and a flow amount in the turbocharger, it is possible to increase the torque, shown by a line c-d, at a time of no turbocharging, to a line a-b at a time of middle speed or more by setting the operation line to be line a-b in FIG. 2. However, the low speed torque is insufficient in comparison with a non-turbocharged engine, so that the starting and accelerating performance from a stop state (hereinafter referred to as zero starting performance) is particularly insufficient for a vehicle engine.

(b) Due to the characteristics of the turbocharger in a turbocharged engine, it is impossible to set not only the low speed torque but also the middle speed torque sufficiently higher than the high speed torque except by limiting the maximum engine output.

(c) In the item (a) mentioned above, the operation line a-b of the turbocharger in FIG. 2 only crosses the maximum efficiency curve c-d at a point r, so that the specific fuel consumption (hereinafter referred to as BSFC) is low near a point r in FIG. 3 corresponding to the r in FIG. 2. However, the efficiency of the turbocharger is low in engine operating states, other than this, and does not have a low BSFC.

(d) As a vehicle engine, the engine is operated along a running resistance curve f-b in FIG. 3, which illustrates the relationship of engine speed vs. BMEP, where BMEP is the engine torque divided by the supply air pressure ratio, so that the running specific fuel consumption of the vehicle, expressed by a unit of 1 km/1 in accordance with the BSFC in a g zone in FIG. 3 having the highest operating frequency, is widely affected. It has been known that the BSFC of the engine closes to an illustrated specific fuel consumption (hereinafter referred to as ISFC), shown by a chain line e-f, in correspondence to an increase of the BMEP, as shown in FIG. 5, and becomes low.

Explaining this by FIG. 3, the vehicle engine turbocharger operating along the line a-b in FIG. 3 increases the performance to the BMEP, for example, 16 kg/cm$^2$, and the BSFC at that time can be set to be 140 g/ps-hr as shown by point a in FIG. 5. However, in the g zone of FIG. 3, the load of the engine becomes about a quarter and the BSFC at this time is increased to 200 g/ps-hr, shown by a point t in accordance with FIG. 5.

Accordingly, if the BMEP can be further increased to twice that of the turbocharger engine shown by a point j in FIG. 5, for example, 32 kg/cm$^2$, the BSFC at a time of being applied a quarter load can be set to be 155 g/ps-hr, shown by a point I, from 200 g/ps-hr shown by the point t.

The current turbocharged engine should further increase the BMEP, and is desired not only to lower the BSFC thereby but also to make a further compact, light weight and inexpensive engine when the output is the same; however, it is impossible for the reasons mentioned above.

(e) A further reason preventing the turbocharged engine from being popular is turbo lag.

The speed of a turbocharger when the engine is in an idling state, at a time when the vehicle is stopped, is about 5000 rpm, and it is required that the turbocharger be accelerated to about 50,000 rpm when the vehicle accelerates. However, the turbocharger has no turbocharging function at the time of zero starting acceleration, so that the vehicle is forced to perform zero starting acceleration at the time of no turbocharging expressed by the line c-d in FIG. 3.

(f) The compression of the engine is increased by turbocharging, so that the maximum pressure at the time of combustion theoretically increases over the permitted maximum pressure of the engine. In a turbocharged engine a countermeasure is taken to meet this matter by reducing the compression ratio.

However, the compression ratio of a diesel engine is generally decided by taking the starting performance into consideration, so that a reduction of the compression ratio makes it hard to start the engine. A start assisting apparatus such as a glow plug or the like is useful for starting the engine, but is not useful for preventing the discharge of a white smoke containing virulent material, such as formaldehyde and the like, immediately after starting. Thus, at 100 rpm at the time of starting and at 600 rpm at the time of idling immediately after starting, the turbocharger does not function as a turbocharger, and does not increase the compressing pressure or the compressing temperature at the time of starting, so that the effect of such countermeasures on starting is a continuing problem.

SUMMARY OF THE INVENTION

The present invention is made for solving the problems mentioned above.

A first object of the present invention is to provide a hybrid supercharging engine having sufficient low speed torque, a high zero starting performance when mounted in a vehicle, being capable of obtaining a middle speed torque without sacrificing maximum output, having a small turbo lag, having a low specific fuel consumption and having an excellent starting performance.

A second object of the present invention is to provide a hybrid supercharging engine which can not only make it possible to set a low BSFC but also make it possible to obtain twice or more BMEP than a turbocharged engine.

A third object of the present invention is to provide a hybrid supercharging system for an engine which the increases the amount of air supplied to the engine by supercharging mainly by means of a supercharger at a time of a low speed, and which can obtain a performance at a time of a steady operation by accelerating a turbocharger, without generating a turbo lag even at at a time of a rapid acceleration from a low speed.

A fourth object of the present invention is to provide a hybrid supercharging system for an engine which effectively functions as a supercharger even at a time of starting, which increases the compression pressure and temperature of the engine and make it easy to start a high compression ratio engine which must be made to have a low compression ratio for starting.

A fifth object of the present invention is to provide a hybrid supercharging system for an engine which can make an engine compact, light weight and inexpensive, and can reduce exhaust $No_x$ without sacrificing engine reliability.

A hybrid supercharging system for an engine, in accordance with the present invention, comprises a turbocharger which reaches its capacity at a speed higher than a maximum torque rotating speed of an engine, and a volume type supercharger provided in series to the turbocharger, wherein a two-step supercharging is performed while controlling the supercharger in such a manner as to keep a supply air amount constant without relation to the engine speed. Accordingly, the plurality of objects mentioned above can be achieved. Further, the present invention is characterized by adjusting the amount of air supplied by the volume type supercharger by a bypass valve in a bypass provided in the volume-type supercharger end and by a supply air flow meter provided in parallel to the valve. Alternatively, the bypass valve in the bypass provided in the volume-type supercharger end may be used with a rotating speed meter provided in the supercharger. Accordingly, the supply air amount can be accurately adjusted.

Still further, the present invention is characterized in that the hybrid supercharging system adjusts the maximum supply air pressure by a supply air pressure meter provided in the supply air system and a bypass valve in a bypass provided in the volume-type supercharger end, so that the pressure within a cylinder of the engine is not over an allowed maximum pressure of the engine. Accordingly, a maximum supply air pressure can be obtained within a range not over the allowed maximum pressure of the engine.

Furthermore, the present invention is characterized in that the hybrid supercharged engine is provided with a Miller cycle system which can obtain a high expansion ratio, and with system controls to reduce the compression ratio and maintain a low specific fuel consumption so that the pressure within the engine cylinders is not over the allowed maximum pressure of the engine. Accordingly, the compression ratio can be reduced, the allowed maximum output of the engine is restricted and the low specific fuel consumption can be obtained.

Moreover, the present invention is characterized by structuring the volume type supercharger in such a manner as to drive it through a slip clutch, controlling the clutch by the supply air pressure meter and the supply air flow meter so as to change the slip rate, and adjusting the supply air pressure and the supply air flow amount to the engine. Accordingly, it becomes easy to control the volume type supercharger.

Further, the present invention is characterized by structuring the volume type supercharger in such a manner as to drive it through a continuously variable transmission, controlling the transmission so as to change the rotating ratio between the engine and the volume type supercharger, and adjusting the supply air pressure and the supply air flow amount to the engine. Accordingly, it becomes easy to control the volume type supercharger.

Still further, the present invention is characterized by structuring the volume type supercharger in such a manner as to drive it through a differential gear mechanism, controlling the differential gear mechanism by the supply air pressure meter, the flow amount meter and the pressure adjusting valve, and adjusting the supply air pressure and the supply air flow amount to the engine. Accordingly, it becomes easy to control the volume type supercharger.

Furthermore, the present invention is characterized by structuring the volume type supercharger in such a manner as to drive it by a spark ignition engine, and controlling the spark ignition engine so as to perform an exhaust gas recirculation (an EGR), thereby reducing $No_x$. Accordingly, it becomes easy to control the volume type supercharger.

Moreover, the present invention is characterized in that the volume type supercharger is a speed type supercharger. Accordingly, the speed type supercharger can achieve the plurality of objects mentioned above, as in the case of the volume type supercharger.

BEST MODE FOR CARRYING OUT THE INVENTION

An embodiment in accordance with the present invention will be described in detail with reference to FIGS. 1 to 12.

Figures 1, 2:
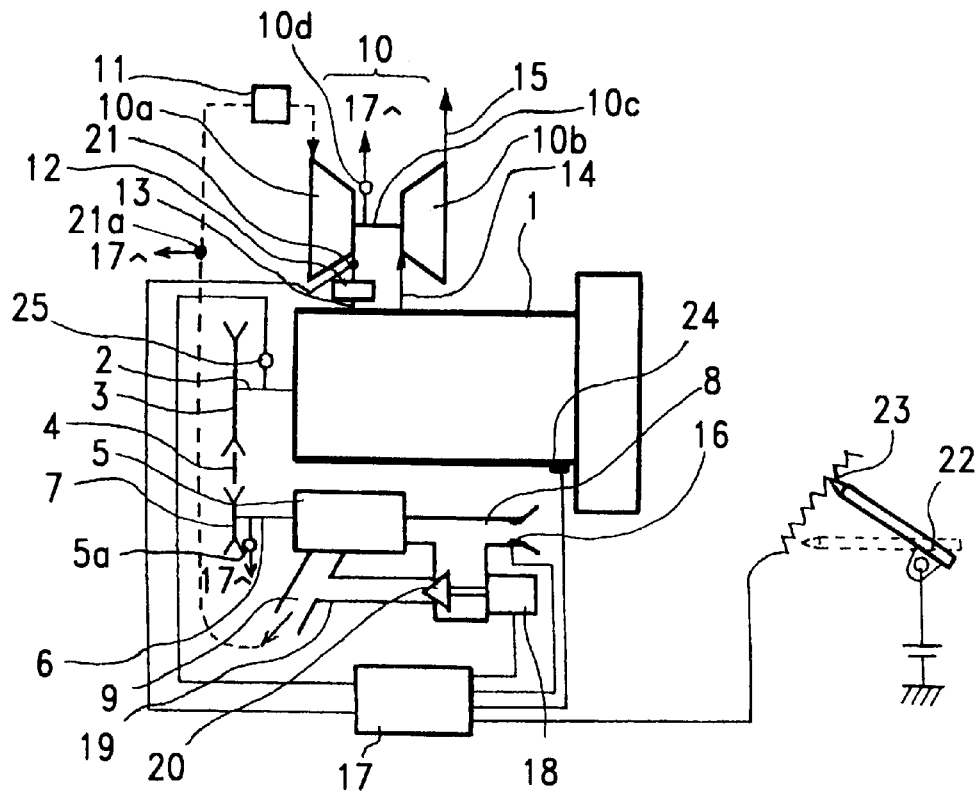
FIG. 1 is a totally schematic view which shows an embodiment of an engine in accordance with the present invention.
FIG. 2 is a graph which shows the ratio between a flow amount and a pressure in a turbocharger.

FIG. 1 shows an embodiment of a hybrid supercharging system for an engine 1 in accordance with the present invention, in which a pulley 3 is fixed to a front end 2 of a crank shaft of the engine 1. Pulley 3 is connected by belt 4 to a pulley 7 fixed to a drive shaft 6 of a supercharger 5 which is driven by the engine 1 to suck ambient air through an intake pipe 8. The supercharger compresses the ambient air and supplies it to a compressor 10a of a turbocharger 10 through a discharge pipe 9 and a supply air cooling device 11. The ambient air is further compressed in the turbocharger 10, and the increased pressure thereof is supplied to the engine 1 through a supply air pipe 13 and a supply air cooling device 12.

A pressure sensor 21 is attached to the supply air pipe 13 so that a turbocharger air pressure signal is transmitted to an electronic controlling device 17. In this embodiment, a supercharger rotating speed sensor 5a is attached to the drive shaft 6 of the supercharger 5. Sensor 5a is connected by a wire to transmit a supercharger rotating speed signal to the electronic controlling device 17.

The turbocharger 10 includes a turbine 10b which is driven by the exhaust gas of the engine 1 which flows through an exhaust manifold 14 and is discharged to the ambient air through an exhaust pipe 15. The rotation of the turbine 10b drives the compressor 10a through a shaft 10c. The rotating speed of the turbine 10b and the compressor 10a is detected by a turbocharger rotating speed sensor 10d attached to the shaft 10c and the sensor output signal is transmitted to the electronic controlling device 17.

A flow meter 16 is located in intake pipe 8, a cooling water temperature sensor 24 is located in the cooling water of engine 1, an engine speed sensor 25 is located at the front end 2 of the crankshaft, and a position sensor 23 for a load controller for a driver and an accelerator pedal to control the drive condition of engine 1 are also provided. These transmit respective information signals to the electronic controlling device 17, and the controlling device 17 then determines a controlling signal to transmit to an actuator 18 which controls the opening of a bypass valve 20 provided in a bypass 19 around the supercharger.

The cooling water temperature sensor 24 may be mounted within a cooling water jacket of the engine 1, and measures the cooling water temperature in the engine 1. The engine speed sensor 25 measures the rotating speed of the front end 2 of the crank shaft in the engine 1. Both sensors transmit signals to the electronic controlling device 17, and the controlling device 17 instructs the actuator 18 to control the opening degree of the bypass valve 20, thereby making it easy to start the engine 1 and reducing the pollution level of the exhaust gas.

In the hybrid supercharging engine in accordance with the present invention mentioned above, the turbocharger 10 in the engine 1 is tuned in such a manner as to increase the pressure ratio along a maximum efficiency line c-d in the performance curve shown in FIG. 2. It also produces an increase in the amount of air flow in such a manner as to become a point d ratio, corresponding to the maximum capacity of the turbocharger 10 at the maximum speed of the engine 1, so that the engine 1 is supercharged by a supply air having a pressure ratio expressed by line a-h in FIG. 3, and has a performance shown by the torque curve corresponding thereto. The torque curve is expressed by the line a-h mentioned above, and shows a drive state in which the bypass valve 20 is fully open and the supercharger 5 does not increase the supply air amount or the pressure ratio, in accordance with the present invention.

Figure 3:
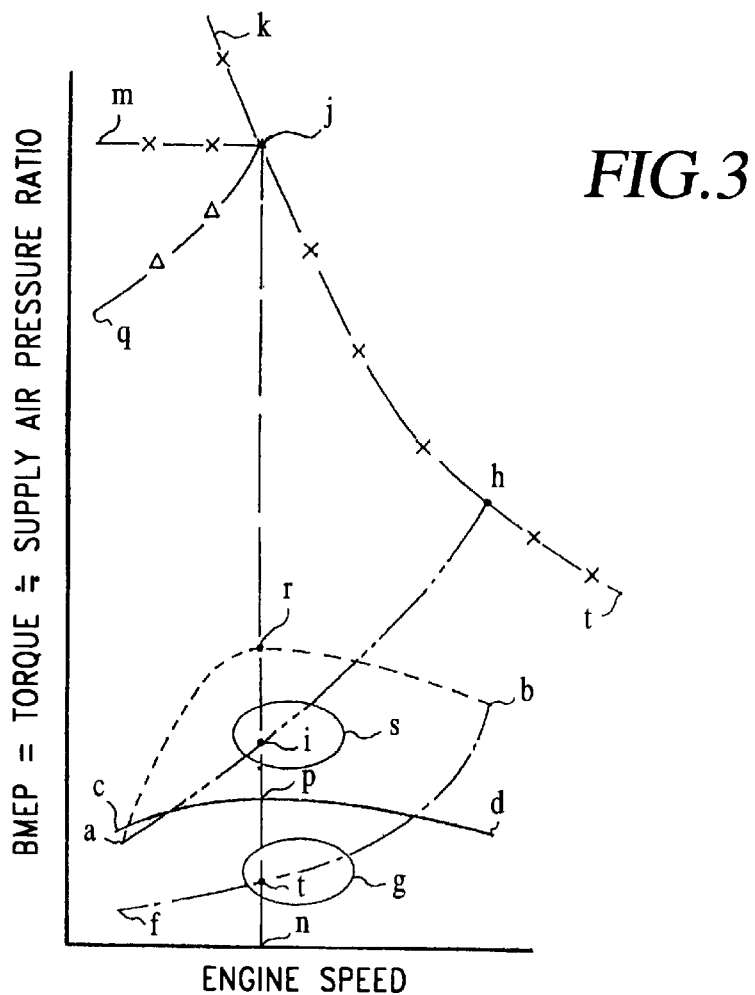
FIG. 3 is a graph which shows the ratio between engine speed and torque and supply air presure.

In the case of driving a vehicle with an engine having the performance characteristics expressed by the torque curve shown by the line a-h in FIG. 3, the running resistance curve of the vehicle becomes substantially equal to the line a-h, so that the accelerating capacity of the vehicle is not obtained and the vehicle can not run until the low speed torque is increased. However, in accordance with the present invention, the supply air pressure and the supply air flow amount are increased by the turbocharger tuned in the manner mentioned above and with the supercharger provided in series to the turbocharger.

At a maximum speed of the engine 1, for example, at 2000 rpm, the flow amount and the pressure ratio of the turbocharger 10 reaches point d in FIG. 2; however, when intending to increase the air flow amount while keeping the pressure ratio at the point d, in accordance with the characteristics of the turbocharger, the point d is going to be over the line f-g (FIG. 2), corresponding to the speed limit of the engine, so that there is a risk that a rotor (not shown) might be broken by centrifugal force. Further, a reduction of the air flow amount would position the point d to the left side of a surging limit line h-f (FIG. 2) so that the turbocharger would not function.

Accordingly, in a full load condition of the engine, in accordance with the present invention, the supply air pressure ratio and the flow amount generated by the supercharger 5 are adjusted in such a manner as to maintain the point d in FIG. 2.

For example, at a time of a low speed in the turbocharged engine, for example, at 1000 rpm, the flow amount of the turbocharger becomes half its capacity, and the supply air pressure ratio generated by the turbocharger becomes point i in FIG. 2. In this case, the torque generated by the engine 1 sucking the supply air indicated by point i is reduced to point i in FIG. 3.

If the engine could produce an exhaust energy having a flow to the turbocharger that would be equivalent to the flow obtained at 2000 rps, then the turbocharger would operate at the point d in FIG. 2. In accordance with the present invention, therefore, at a time of low speed and full load, the flow amount of the intake air at inlet 8 is measured by the flow amount meter 16. In order to produce the same air flow amount as would be available at 2000 rpm even at 1000 rpm, the air flow sensor output signal is transmitted to the electronic controlling device 17, and the controlling device 17 instructs the actuator 18 to rotate the bypass valve 20 in a direction of closing the bypass valve 20, thereby increasing the supply air amount flowing through the supercharger 5.

In order to make the supply air amount to the engine the same as would be available at 2000 rpm even at 1000 rpm, it is necessary to double the supply air amount, thereby making the intake air amount flowing through the flow amount meter 16 constant. This is done by setting the pressure ratio within the discharge pipe of the supercharger 5 to be about 2. Accordingly, the pressure ratio within the supply air pipe becomes a pressure ratio expressed by 3 (generated by the turbocharger)×2 (generated by the supercharger)=6, and the engine 1 can generate the torque shown by the point j in FIG. 3 by utilizing the doubled supply air.

If the engine speed is lowered, the bypass amount would be adjusted by the flow amount meter 16, the electronic controlling device 17, the actuator 18 and the bypass valve 20, so that the intake air amount of the engine 1 would remain constant. This would tend to increase the pressure ratio generated by the supercharger 5 at a lower speed than 1000 rpm, and would increase the torque to a point k in FIG. 3 so as to set the pressure ratio within the supply air pipe to be a value over 6. However, in this case, the combustion pressure of the engine receiving this air flow would exceed the allowed maximum pressure of the engine 1, so that it is impossible to realize this.

Accordingly, at an engine speed lower than the point j in FIG. 3, the supply air pressure signal which is transmitted to the electronic controlling device 17 by the pressure sensor 21 provided within the supply air pipe 13 would operate to ensure that the supply air pressure ratio is not over, for example 6. Accordingly, the controlling device 17 would instruct the actuator 18 to adjust the opening degree of the bypass valve 20, thereby making the supply air pressure ratio constant, so that the torque generated by the engine 1 would be set to be a value corresponding to a point m in FIG. 3.

In the above description, the operation of the hybrid supercharging engine in accordance with the present invention has been described in a fully loaded condition. However, an example of an operation at a time when the engine is partly loaded is shown by a line n-i-j at a speed of, for example, 1000 rpm in FIG. 3. The supply air pressure from a no load condition to a full load condition will be illustrated in FIG. 4.

Figure 4:
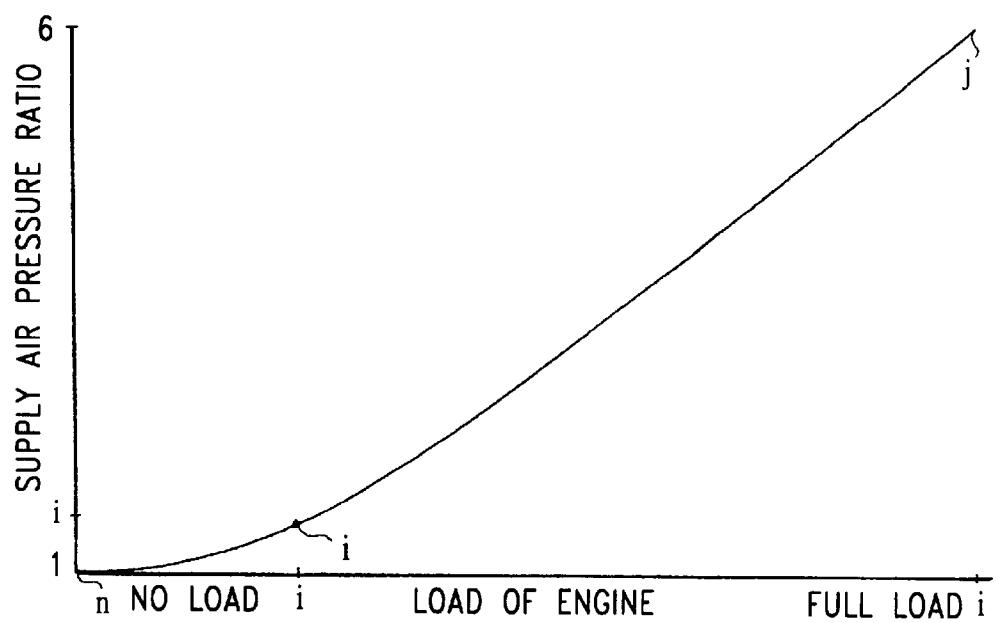
FIG. 4 is a graph which shows the ratio between the load of an engine and supply air pressure.

Point n in FIG. 4 illustrates a state when no load is applied, i.e., when a load controller such as an acceleration pedal 22 in FIG. 1 is positioned at a position shown by a solid line. The position sensor 23 transmits the no load condition signal to the electronic controlling device 17, and the controlling device 17 instructs the actuator 18 to make the bypass valve 20 fully open. Accordingly, the supercharger 5 does not function, and ambient air is supplied to the engine 1 through the intake pipe 8, the bypass 19, the discharge pipe 9, the turbocharger 10 and the supply air pipe 13. The turbocharger 10 does not increase the supply air pressure ratio in this state, and the ambient air pressure, that is, the pressure ratio, stays in the range of 1.

In order to increase the load of the engine 1 to the torque represented by point i in FIG. 3, the accelerating pedal 22 is slightly stepped into by the driver and moved toward the dotted line location so as to increase the fuel supply by a small amount. The position sensor 23 transmits the position thereof to the electronic controlling device 17, and the controlling device 17 instructs the actuator 18 to keep the bypass valve 20 in its fully open state.

Accordingly, at point i in FIGS. 3 and 4, a supercharging is performed by only the turbocharger 10. The exhaust temperature is increased by the increase of the fuel supply amount. The turbocharger 10 increases the supply air pressure ratio to the point i in FIG. 4 and the engine 1 utilizes the supply air pressure so as to generate a torque higher than the point p at a time of no supercharging in FIG. 3.

When the accelerating pedal 22 is moved in a direction of the position shown by the dotted line so as to increase the fuel supply amount, the position sensor 23 transmits the position thereof to the electronic controlling device 17, and the controlling device 17 instructs the actuator 18 to rotate the bypass valve 20 in a direction of closing the bypass valve 20 so as to increase the pressure within the discharge pipe 9. This, combined with the turbocharger 10, increases the pressure ratio within the supply air pipe 13 in such a manner as to produce a supply air amount corresponding to the fuel supply amount.

When the engine is fully loaded, the accelerating pedal 22 is stepped into a position shown by the dotted line in FIG. 1, the fuel supply amount becomes maximum, the position sensor 23 transmits this to the electronic controlling device 17, and the controlling device 17 instructs the actuator 18 to rotate the bypass valve 20 in a direction of further closing the bypass valve 20. This increases the pressure within the discharge pipe by reducing the flow amount through the bypass valve 20, and together with the operation of turbocharger 10 increases the pressure within the supply air pipe 13.

The intake air amount to the engine 1 at this time is measured by the flow amount meter 16, and transmitted to the electronic controlling device 17. The controlling device 17 instructs the actuator 18 to adjust the opening area of the bypass valve 20 so that the air amount is not over the point d in FIG. 2, corresponding to the limit of the turbocharger 10. Accordingly, the supply air pressure generated by the turbocharger 10 becomes, for example, 3, and because of the reason mentioned above, is adjusted so that the pressure ratio of the point j in FIG. 4 becomes 6 and the pressure ratio within the discharge pipe generated by the supercharger 5 becomes 2.

While still keeping this state, when the speed of the engine 1 becomes, for example, 1000 rpm or less, the intake air amount of the engine 1 is reduced in portion to the engine speed, and the pressure ratio generated by the turbocharger 10 is reduced along the line c-d in FIG. 2, so that the torque generated by the engine 1 changes to the line q-j in FIG. 3.

The torque curve of the hybrid supercharging engine in accordance with the present invention shown by a line q-j-h in FIG. 3 gives a performance which is several times better than the performance of the conventional turbocharged engine, which follows the torque curve a-r-b. However, as importance is attached to vehicle engine torque at a low speed, it is possible to make an ideal torque curve, expressed by line m-j as long as the torque is kept within the supply air pressure ratio at a time of fully loading as shown in FIG. 4; for example, 6, even at an engine speed of 1000 rpm or less, so as not to be over the allowed maximum pressure of the engine 1.

In order to provide this, in accordance with the present invention, the pressure sensor 21 is attached within the supply air pipe 13, the pressure within the supply air pipe 13 is measured, the sensor pressure signal is transmitted to the electric controlling device 17, and the controlling device 17 instructs the actuator 18 to adjust the opening area of the bypass valve 20 to correct the line q-j in FIG. 3 to the line m-j.

Figure 5:
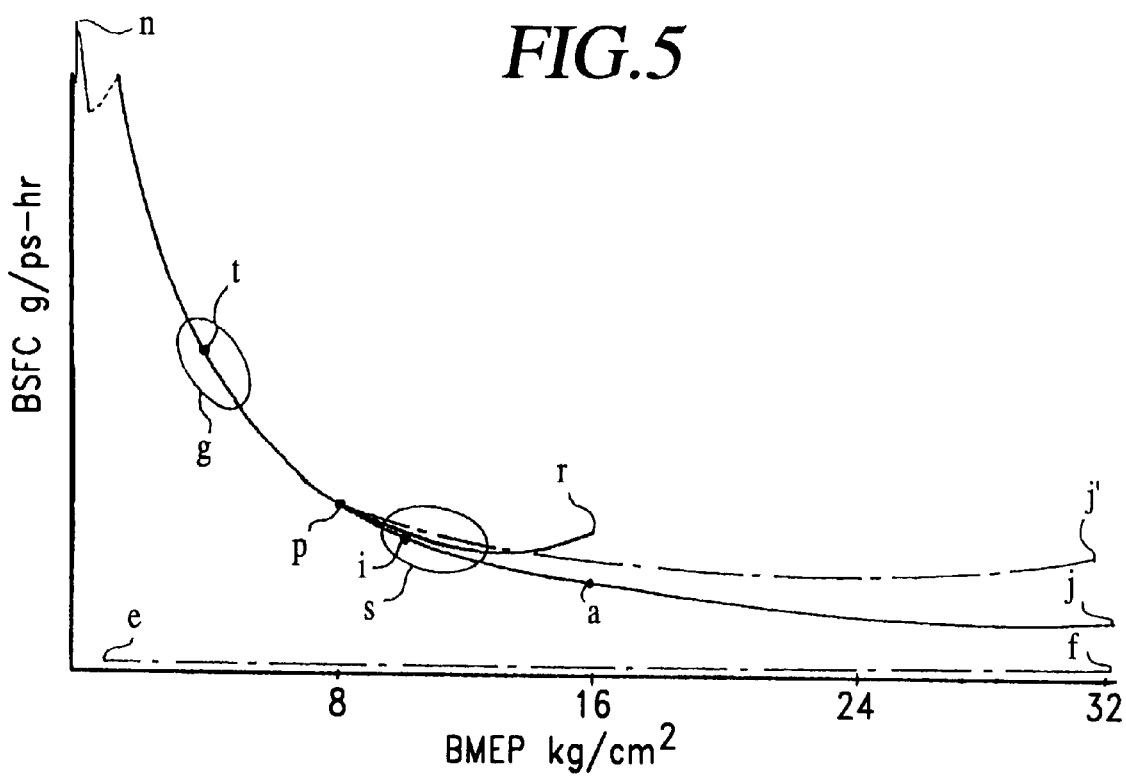
FIG. 5 is a graph which shows the relation between the ratio of supply air pressure in an engine and specific fuel consumption.

Next, the BSFC (specific fuel consumption) of the engine utilizing the hybrid supercharging system in accordance with the present invention will be described. As shown in FIG. 5, the BSFC is infinite because of the reason mentioned above, when the BMEP (engine torque divided by supply air pressure ratio) is zero; however, as the BMEP increases, it closes to the ISFC (illustrated specific fuel consumption), and the BSFC is reduced.

The BSFC at a time when the engine in accordance with the present invention generates the torque of the point j in FIG. 3 will be shown by a point j in FIG. 5. At this time, the turbocharger 10 operates at the point d in FIG. 2, has a high efficiency, and directs a low BSFC. However, the drive force of the mechanically driven supercharger is added as a frictional average effective pressure FMEP, and increases the BSFC from the point j in FIG. 5 to the point j, so that the excellence of the BSFC in the maximum torque point is not apparently present.

The load ratio having the highest frequency of use for the vehicle engine is the s zone shown in FIG. 3, and the BSFC at this time determines the running specific fuel consumption of the vehicle. When this is drawn in FIG. 5, the s zone can be obtained.

In contrast, the maximum torque of a conventional turbocharged engine occurs at point r in FIG. 3, and a zone having a high using frequency for this engine is shown at g. When this is drawn in FIG. 5, the BSFC becomes the g zone, and the difference in the running specific fuel consumption is apparent by comparing this with the s zone of the engine in accordance with the present invention.

Figure 6:
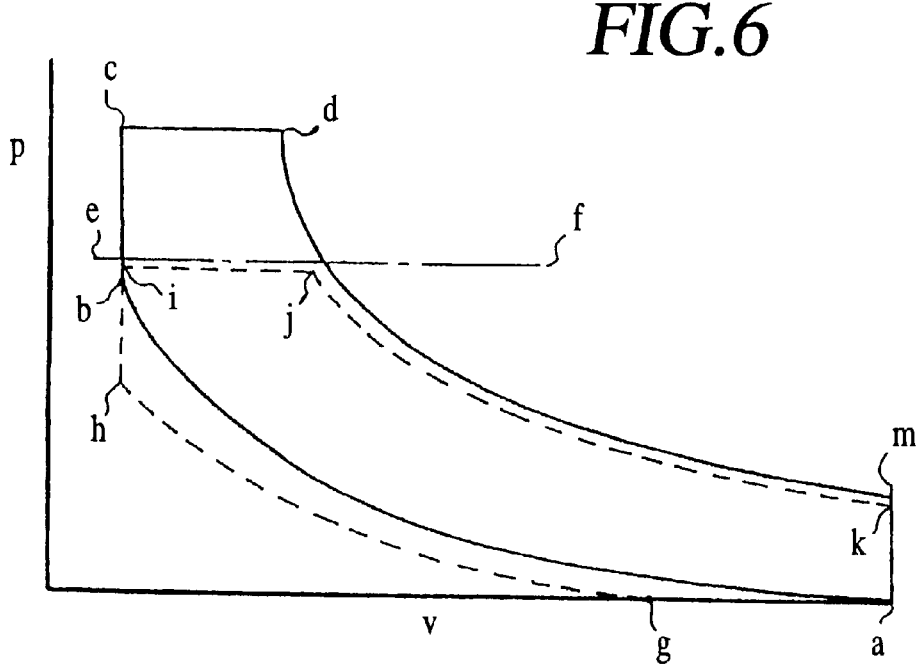
FIG. 6 is a graph which shows a p-v line in a Miller cycle.

In this case, in the engine to which the high supply air pressure, for example reaching the pressure ratio 6, is supplied, the compressing pressure shown by the point b (FIG. 6) is high at the normal compressing ratio 14 to 16, as shown by the solid line a-b in the p-v line of FIG. 6. Further, the combustion pressure becomes higher as the compression line b-c-d is followed, thereby being over the allowed maximum pressure of the engine shown by the line e-f. A reduction of the compression ratio so as to cope with this not only would increase the BSFC but also would reduce the expansion ratio, so that the exhaust temperature would become high and the thermal load of the engine would be increased.

In accordance with the engine of the present invention, the compression ratio can be made low in comparison with the line a-b. The compression pressure can be powered to the point h and the combustion pressure can be made lower than the allowed maximum pressure of the engine, corresponding to the line e.f, as shown by the line h-i-j, by starting the compression at the point g in the middle of the compression process and ending the compression process at the point h, as shown in FIG. 6, by using the Miller cycle.

Accordingly, the expansion process follows the line j-k, which is substantially equal to the line d-m in the case where the compression ratio is high. As a result, the expansion ratio does not change even by reducing the compression ratio, and not only does the BSFC not change, but also the exhaust temperature can be reduced by the high expansion ratio.

The Miller cycle in the engine in accordance with the present invention can be realized by a so-called "early closing", which is structured by providing a rotary valve in an intake air passage of a known engine, and a closing timing is closed in the middle of the suction process, for example, in the point g in FIG. 6. However, it can be also realized by a known "delayed closing".

Figure 7:
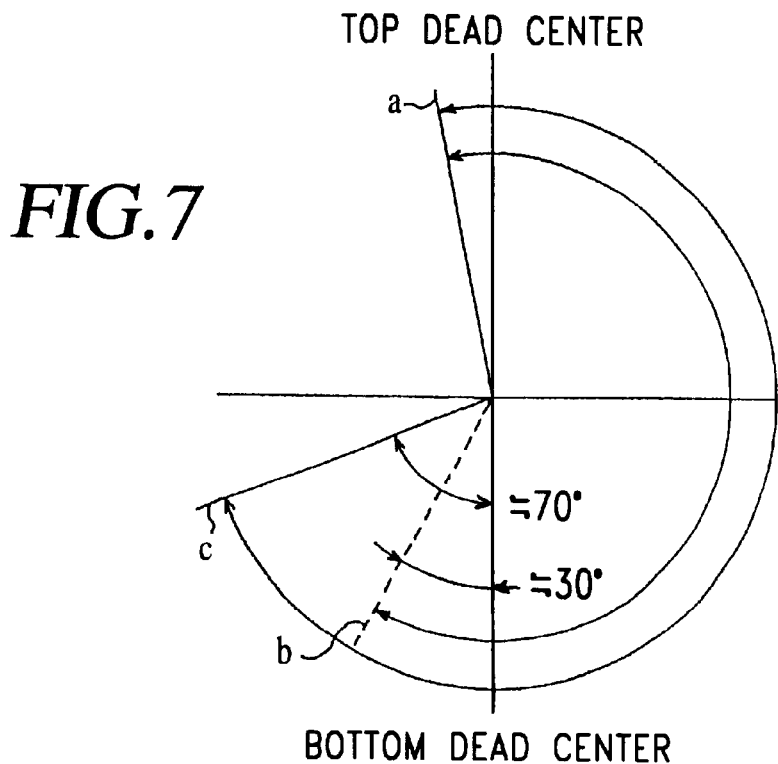
FIG. 7 is a diagram which shows valve opening and closing in an engine.

FIG. 7 shows an example thereof, and in the normal engine, the suction (intake) valve (not shown) opens at an angle "a" slightly before top dead center corresponding to about 10 degrees, and closes at an angle "b" about 30 degrees after bottom dead center. However, in accordance with the present invention, the intake is started at the angle a, the intake valve is kept open after passing through the bottom dead center and becoming a compressing process, and the air within the cylinder once sucked to the bottom dead center of the suction process is again continued to be discharged into the suction passage after entering into the compressing process, thereby not increasing the pressure within the cylinder. However, when reaching an angle c corresponding to about 70 degrees after passing the bottom dead center, the intake valve is closed.

When this is shown in FIG. 6, the point g is obtained, and from this point, an actual compressing process is started, so that the delayed closing Miller cycle can be obtained in the manner mentioned above.

In the case that the engine of the present invention is an engine for a ship which requires a maximum BMEP near the maximum speed of the engine and does not require a high BMEP in low and medium speeds, when a tuning is performed such as to set the engine speed at the point j in FIG. 3 to be the maximum speed of the engine, for example, 2000 rpm, and to set the point d in FIG. 2 corresponding to the maximum capacity of the turbocharger to be the point h in FIG. 3, for example, 4000 rpm, the maximum BMEP can be generated at the maximum speed of the engine because of the reason mentioned above.

In the case that the engine of the present invention is used as a construction machine which requires a low and medium speed BMEP which is higher than the BMEP at the maximum speed of the engine, that is, it requires a so-called high torque rise, the BMEP at the point t of FIG. 3 can be obtained, for example, at 2500 rpm, by further increasing the engine speed to keep the flow amount of the turbocharger in the engine operating at the maximum performance of the turbocharger shown by the point d in FIG. 2, for example, at 2000 rpm, and keeping the performance of the point h in FIG. 3 constant.

Figure 8:
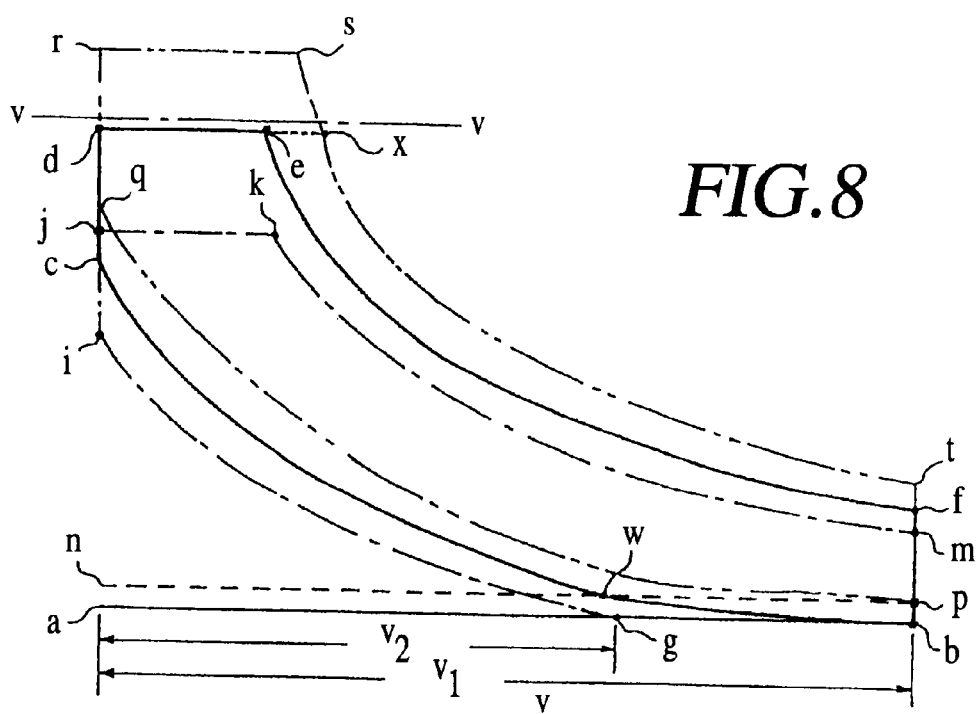
FIG. 8 is a diagram which shows a cycle line.

This is explained in FIG. 8, in which the supply air pressure of the point h in FIG. 3 corresponds to a line a-b in FIG. 8. The engine starts suctioning from the top dead center of the suction process at point a, the intake valve is closed near point b corresponding to the bottom dead center, the compressing process is started from point b to become the upper dead center at point c, and the exhaust valve is opened at point f by expansion after burning to increase the pressure to the line c-d-e. However, when the engine speed is increased, the flow amount flowing through the turbocharger increases and the operating point of the turbocharger goes over point d in FIG. 2. Accordingly, for example, when the engine speed is increased 1.25 times, from 2000 rpm to 2500 rpm, the suction air amount of the engine is $\frac{1}{1.25}$ times, in inverse proportion to the engine speed, so that it is necessary to make the flow amount of the turbocharger 10 constant. Then, the Miller cycle mentioned above can make this possible.

FIG. 8 explains the matter. For example, when the engine speed is 2000 rpm, the engine sucks in air at an amount of $v_1$ from point a to point b. However, when the engine speed becomes 2500 rpm, the substantial suction amount becomes $V_2$, corresponding to $\frac{1}{1.25}$ times the amount $v_1$ by keeping the intake valve open to the point g in the middle of the compression process. As a result, the flow amount of the turbocharger can be made constant even when the engine speed is increased.

The p-v line at this time becomes the line g-i-j-k-m-b, and the BMEP is reduced to a level of $\frac{1}{1.25}$ the level it was at the speed of 2000 rpm, as is understood from FIG. 8, so that it becomes point t in FIG. 3.

In contrast, when the engine speed is reduced, the supply air pressure is increased because of the reason mentioned above. As illustrated in FIG. 8, when the supply air pressure is increased to a line n-p, the p-v line becomes a line p-q-r-s-t, and the maximum pressure is over the allowed maximum pressure of the engine, which is shown by the line v-v. However, by applying the Miller cycle, as mentioned above, the p-v line becomes a line w-c-d-e-f-p by closing the intake valve at the point w.

A high ratio output engine in accordance with the present invention must reduce the compression ratio to provide adequate starting performance, particularly in starting at a low temperature. The engine of the present invention is driven by its starter motor (not shown) at a speed of about 100 rpm at the time of starting. This speed is sensed by the engine speed sensor 25 provided in the front end 2 of the crank shaft, which sends a speed signal to the electronic controlling device 17. The controlling device 17 instructs the actuator 18 to fully close the bypass valve 20, so that the supercharger 5 compresses the intake air in an adiabatic manner and increases the pressure and the temperature of the air within the discharge pipe 9. This compressed air is supplied to the engine through the supply air cooling device 11, the compressor 10a and the supply air cooling device 12. However, the turbocharger 10 does not increase the air pressure at such a low speed. Even when the compression ratio of the engine is 8, it is possible to increase the pressure ratio by 2 in the supercharger 5, so that it is thereby possible to increase the pressure within the cylinder to a pressure corresponding to the compression ratio 16 obtained by a formula 8×2=16. Although the supply air is heated to a high temperature by the supercharger 5, it is also cooled by passing it through the supply air cooling devices 11 and 12, with the result that the compression temperature of the engine is reduced by a reduction of the supply air temperature, making it impossible to start.

Figure 9:
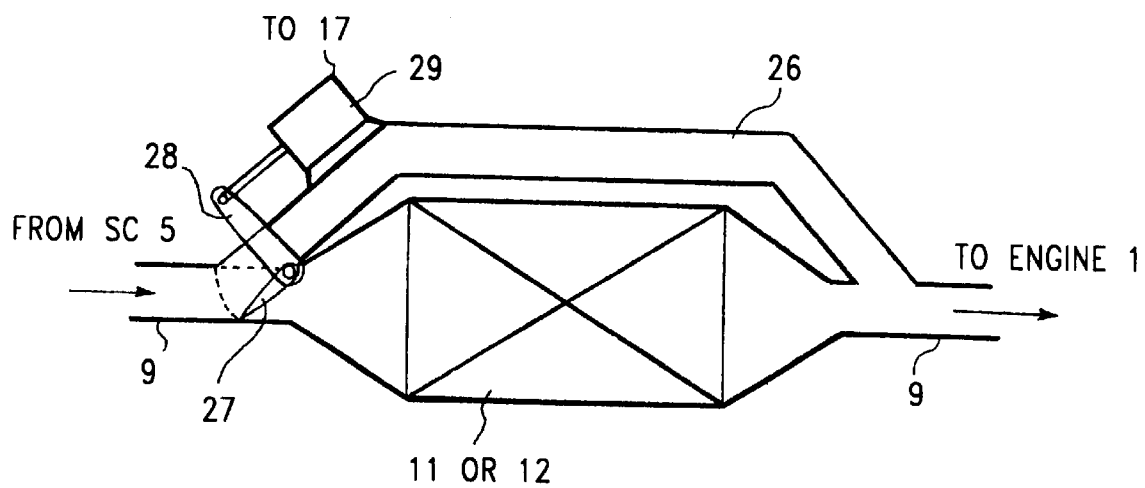
FIG. 9 is a schematic view of a supply air cooling device for a second embodiment of the invention.

To overcome this problem, as shown in FIG. 9, a bypass 26 is provided between the supply air inlet 9 and the outlet of the supply air cooling devices 11 and 12, and a switching valve 27 is attached to a connecting portion between the bypass 26 and the discharge pipe 9, so that the passage to the end of the supply air cooling devices 11 and 12 connected to the discharge pipe 9 can be closed so that the supply air is not cooled by the supply air cooling devices 11 and 12 when the passage to the bypass 26 is opened. If the cooling water temperature of the engine at the time of starting is low, the cooling water sensor 24, shown in FIG. 1, transmits the temperature to the electronic controlling device 17, and the controlling device 17 instructs an actuator 29 to press a lever 28 to close the end of the passage leading to the supply air cooling devices 11 and 12 and to open the passage to the bypass 26.

Immediately after the engine is started, when the engine cooling water temperature is low, the compression temperature remains low, the fuel is incompletely burned, and a white smoke containing a solution component such as formaldehyde and the like is discharged.

In order to cope with this problem, in accordance with the engine of the present invention, even when the position sensor 23 transmits to the electronic controlling device 17 information that the position of the accelerating pedal 22 is in an idling state, the electronic controlling device 17 instructs the actuator 18 to close the bypass valve 20 in accordance with the low temperature information from the cooling water temperature sensor 24, and increases the compression temperature and the pressure of the engine by increasing the pressure and the temperature of the discharge pipe 9 by means of a supercharger 5. This avoids cooling of the supply air by the supply air cooling devices 11 and 12.

Next, another embodiment to which a principle of the hybrid supercharging engine, in accordance with the present invention is applied, will be shown below.

Figure 10:
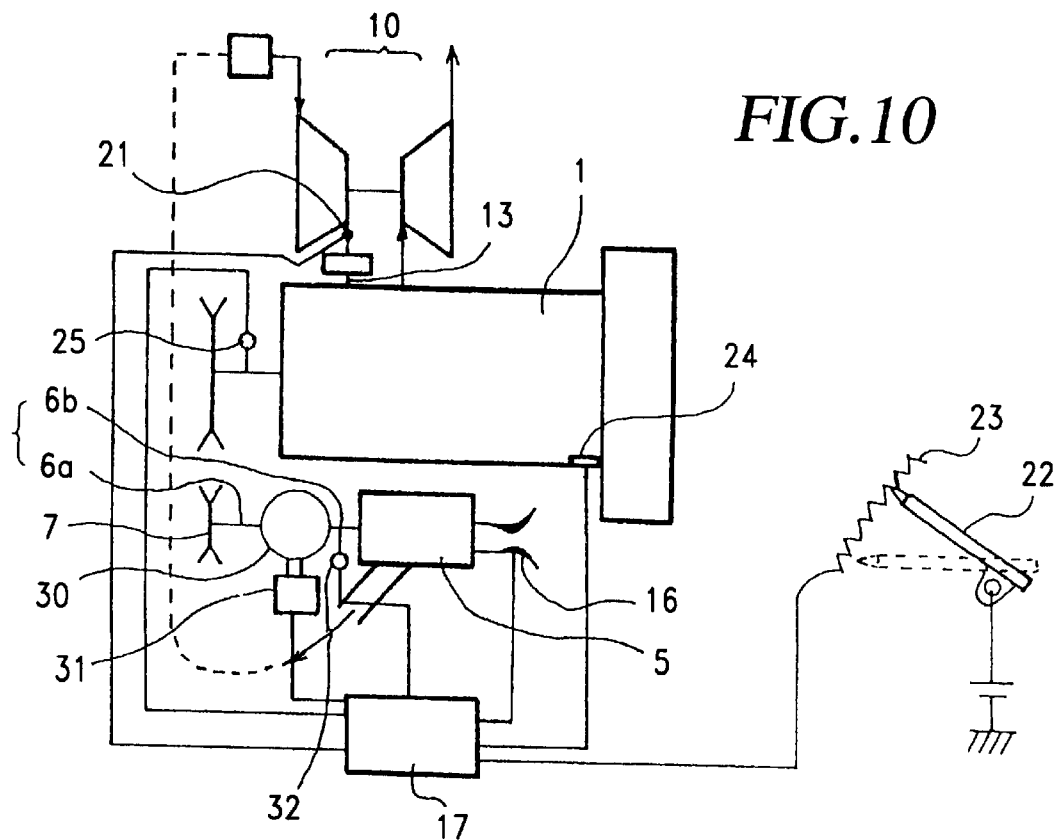
FIG. 10 is a schematic view which shows a third embodiment in accordance with the present invention.

The third embodiment, illustrated in FIG. 10, is characterized by a continuously variable transmission 30 (hereinafter referred to as a CVT) which is provided between the shafts 6a and 6b. The shaft 6a supports the pulley 7, which drives the supercharger 5, and the shaft 6b is connected between transmission 30 and the supercharger. In place of adjusting the supply air flow amount and the supply air pressure by means of the bypass valve 20, as in the embodiment shown in FIG. 1, the drive ratio of the CVT is adjusted. Accordingly, at a time of full load, that is, at a time of full load in which the position sensor 23 detects that the accelerating pedal 22 has reached the position shown by the dotted line, a signal is transmitted to the electronic controlling device 17 which causes the torque curve to follow line h-j in FIG. 3, as described above. The intake air flow amount of the engine 1 is measured by the flow amount meter 16 so as to be constant during the line h-j, and this signal is transmitted to the electronic controlling device 17, so that the controlling device 17 instructs an actuator 31 to adjust the CVT 30 rotating ratio between the drive shafts 6a and 6b to drive the supercharger 5 accordingly.

The volume type supercharger 5 has a characteristic that the rotating speed and the flow amount are directly proportional to each other, and the flow amount can be adjusted by adjusting the rotational speed. That is, an adjustment can be performed by measuring the rotational speed of the supercharger 5 by a speed meter 32 attached to a drive shaft 6b so as to transmit a speed signal to the electronic controlling device 17. The controlling device then adjusts the rotational speed of the supercharger 5. In this case, the torque is shown by the line h-j in FIG. 3, and the rotational speed of the supercharger 5 becomes constant.

Similarly, also between the line m-j in FIG. 3, as mentioned above, the pressure within the supply air pipe 13 is measured by the pressure meter 21. To prevent the combustion pressure from exceeding the allowed maximum pressure of the engine, the pressure meter 21 transmits a pressure signal to the electronic controlling device 17, and the controlling device 17 instructs the actuator 31 to adjust the CVT 30 to control the speed of the supercharger 5.

In the fourth embodiment, if the CVT 30 in FIG. 10 incorporates a clutch, including a known hydraulic clutch or a slide clutch, the function of the present invention can be obtained in the same manner as with the CVT 30 if it is possible to adjust, by the actuator 31, the slipping rate in the speed ratio between the drive shafts 6a and 6b.

Figure 11:
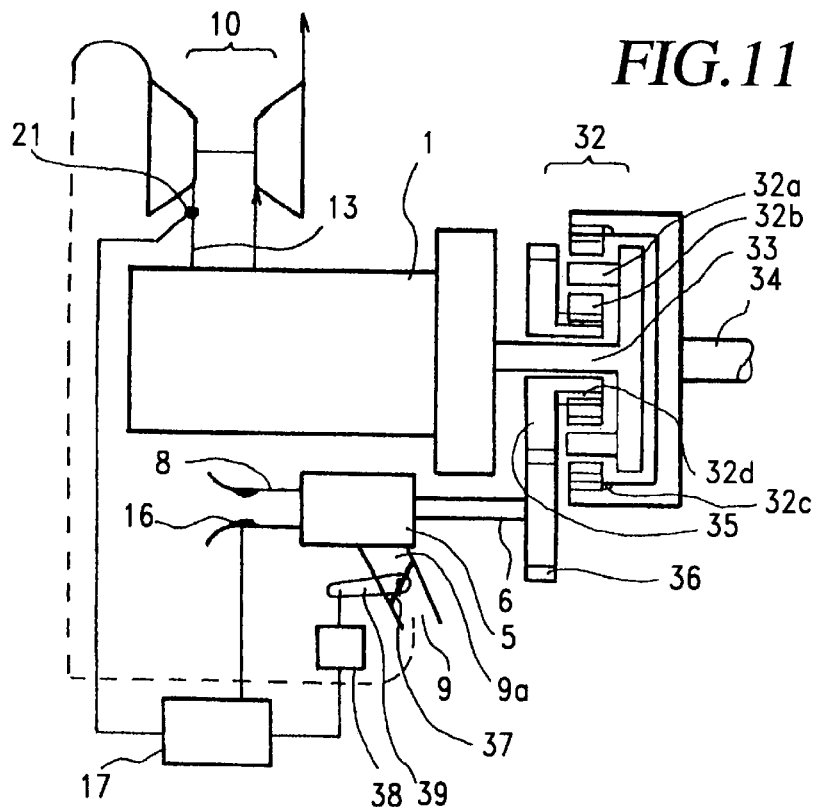
FIG. 11 is a schematic view which shows fourth and fifth embodiments in accordance with the present invention.

A fifth embodiment, illustrated in FIG. 11, utilizes a known differential for driving a supercharger by a differential gear in a hybrid supercharging engine. In accordance with the present invention, the supercharger 5 is driven by the differential gear in place of the belt 4 in FIG. 1. In FIG. 11, the output of the engine 1 is transmitted to an output shaft 33. A plurality of shafts 32a for driving a plurality of planetary gears 32b of a differential gear 32 are fixed to the output shaft 33. The planetary gear 32b is meshed with an internal gear 32c and a sun gear 32d, and the internal gear 32c is fixed to a drive shaft 34, which in turn is connected to drive a wheel (not shown) of the vehicle. The planetary gear 32b transmits a reaction force to the sun gear 32d, and a gear 35 fixed to the sun gear 32d drives a supercharger drive gear 36 fixed to the drive shaft 6 of the supercharger. Accordingly, the supercharger 5 is driven by the engine 1 normally in accordance with 10% of the engine torque. A characteristic of the differential gear mechanism is that the torque ratio transmitted to the drive shaft 34 and the sun gear 32d is constant, so that when the running resistance of the vehicle is great, the torque for driving the supercharger 5 is great, the supercharger 5 increases the supply air pressure in response to the torque, and the engine 1 generates a high torque due to the supply air pressure.

Accordingly, in the full load condition of the hybrid supercharging engine in accordance with the present invention, the torque and the supply air pressure characteristics follow line j-h in FIG. 3. So that the intake air amount will be constant even when the engine speed is changed, the amount is measured by the flow amount meter 16, and a flow signal is transmitted to the electronic controlling device 17. The controlling device 17 instructs an actuator 38 to adjust the opening degree of a brake valve 37 fixed to a lever 39, and thereby changes the pressure of an upstream portion 9a of the discharge pipe 9, thereby adjusting the drive torque and the rotational speed of the supercharger 5 and controlling the flow amount.

When the brake valve 37 is turned to be in a fully closed state, the pressure in the upstream portion 9a of the discharge pipe is increased, the drive torque of the supercharger 5 becomes higher than the torque divided by the sun gear 32d, the rotation of the sun gear 32d is stopped, and the engine output is exclusively transmitted from the output shaft 33 to the drive shaft 34. Accordingly, it is possible to adjust the rotating speed of the supercharger 5 by adjusting the opening degree of the brake valve 37, and it is possible to adjust the flow amount flowing through the flow amount meter 16.

Similarly, it is possible to adjust the pressure within the discharge pipe 9 by transmitting the pressure of the pressure meter 21 attached to the supply air pipe 13 to the electronic controlling device 17 and adjusting the opening degree of the brake valve 37 by an instruction from the controlling device 17 to the actuator 38, so that the torque expressed by the line m-j in FIG. 3 can be generated in the engine.

A sixth embodiment relates to an improvement of the invention filed by the inventor as Japanese Patent Application No. 5-208889.

When a fuel containing no sulfur is used and the exhaust from a spark ignition engine operated at a theoretical air fuel ratio is purified by a three way catalyst, an exhaust gas containing no sulfur, no phosphorus and no $No_x$ can be obtained. In this case, an exhaust gas recirculation (an EGR) is performed to the diesel engine, so that in the diesel engine, abrasion is not promoted by phosphorus and sulfur, and the EGR is performed by gas containing no $No_x$ thereby reducing $No_x$ in the exhaust gas, as is known by a paper of the inventor, for example, SAE PAPER 960842.

Figure 12:
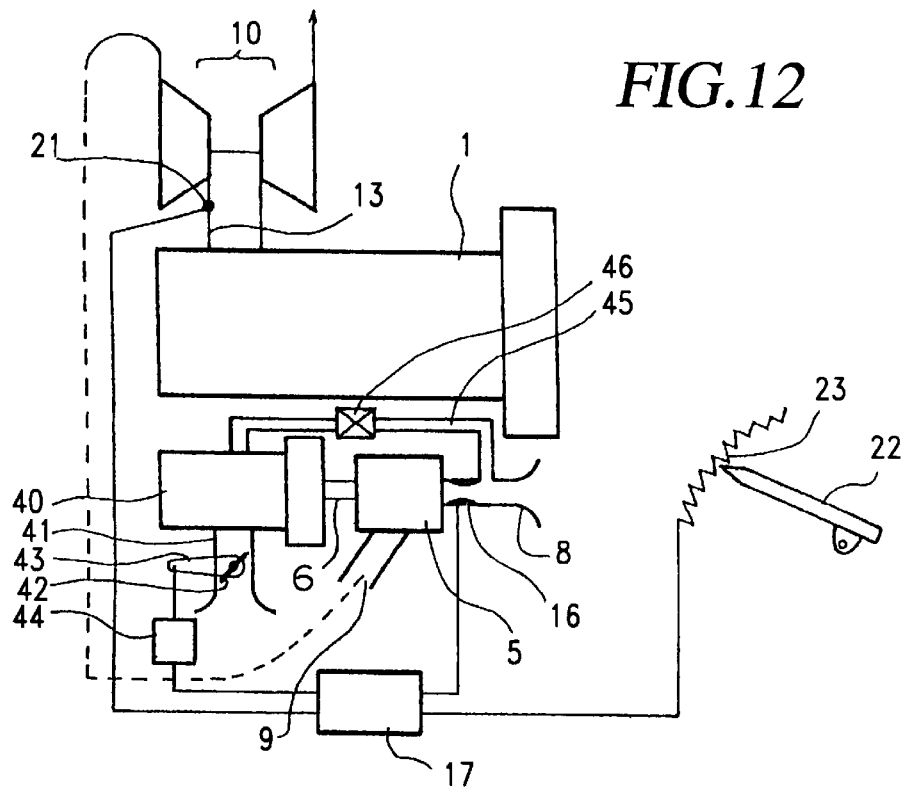
FIG. 12 is a schematic view which shows a sixth embodiment in accordance with the present invention.

In accordance with the present invention, as illustrated in FIG. 12, the structure is made so as to drive the supercharger 5 by a spark ignition engine 40. The supercharger draws ambient air from the intake pipe 8 and increases the pressure within the discharge pipe 9. The exhaust gas from the spark ignition engine 40 is directed into the intake pipe 8 as the EGR gas after it is purified by a three way catalyst 46 disposed in the middle of the discharge pipe 45. This exhaust gas is compressed by the supercharger 5 and is supplied to the engine 1 through the discharge pipe 9, the turbocharger 10 and the supply air pipe 13.

Because of the reasons mentioned above, at a time of full load state in which the torque is shown by the line j-h in FIG. 3, the gas amount supplied to the engine 1; that is, an air amount plus an EGR gas amount, must be made constant even when the engine speed is changed. The air amount is measured by the flow amount meter 16, and the measurement is transmitted to the electronic controlling device 17. The controlling device 17 instructs an actuator 44 to adjust the degree of opening of a throttle valve 42 provided within a suction pipe 41 of the spark ignition engine 40, thereby adjusting the output of the spark ignition engine 40 and adjusting the rotating speed of the supercharger 5 so as to control the flow amount.

Further, also between the line m-j in FIG. 3, because of the reasons mentioned above, the supply air pressure within the supply air pipe 13 must be constant even when the engine speed is changed. Therefore, the engine output is adjusted by measuring the pressure within the supply air pipe 13 by the pressure sensor 21, which transmits to the electronic controlling device 17. The opening degree of the throttle valve 42 is adjusted by an instruction from the controlling device to the actuator 41 so as to control the output of the spark ignition engine 40, thereby controlling the pressure and the flow amount within the discharge pipe 9.

The driver operates the accelerating pedal 22 in response to the load of the engine 1, the position sensor 23 transmits the position thereof to the electronic controlling device 17, and the controlling device 17 instructs the actuator 44 to operate the throttle valve in such a manner as to obtain the supply air amount and the pressure in accordance with the load so as to adjust the output of the spark ignition engine 40, thereby adjusting the speed of the supercharger 5 and controlling the supply air flow amount and the pressure.

In the third, fourth, fifth and sixth embodiments, the supply air flow amount and the pressure to the engine 1 is controlled by making the rotating speed of the supercharger 5 variable. In these devices it is supposed that the supercharger 5 is a volume type supercharger; however, the compressor of the turbocharger, corresponding to a speed type supercharger, is also a compressor increasing the flow amount and the pressure together with the rotating speed, so that the supercharger shown as the supercharger 5 in FIGS. 10 and 12 is not limited to a volume type, and may be a speed type such as, for example, a centrifugal type compressor (not shown) in view of its function.

In this case, in the embodiments mentioned above, the structure is made such that at first the supercharger driven by the engine sucks and pressurizes the ambient air, supplied this to the compressor of the turbocharger so as to further pressurize, and increases the pressure so as to supply to the engine through the supply air pipe and the like. However, this may be inversely structured; that is, at first the compressor of the turbocharger, driven by the exhaust of the engine sucks and pressurizes the ambient air which is then supplied to the supercharger driven by the engine power. The air is further pressurized, and increases the pressure so as to supply air to the engine through the supply air pipe and the like. In accordance with a research by the inventor, it is understood that the latter stabilizes the operation of the turbocharger in comparison with the former and the supercharger can be made compact.

What is claimed is:

1. A hybrid supercharged engine system, comprising:
    an engine having an inlet for air and an outlet for exhaust gases and including an output crank shaft;
    a turbocharger having a turbine connected to the engine output and a compressor having an inlet and pressurization outlet connected to the engine inlet, said turbocharger being capable of producing a maximum compressor output at an engine speed which is higher than a maximum torque engine speed for said engine;
    a volume type supercharger having an air intake, an air outlet, and a drive shaft, said drive shaft being drivingly coupled to said engine crank shaft to drive said supercharger to provide pressurized air at said air outlet, said supercharger air outlet being connected to said turbocharger air inlet to supply said pressurized air to said turbocharger;
    an air flow adjuster connected to said supercharger for controlling air pressure at said supercharger outlet; and
    sensors for detecting engine speed and engine load and controlling said air flow adjuster to cause said supercharger to change the pressure of the air supplied by said turbocharger to said engine in inverse proportion to the speed of said engine.

2. The hybrid system of claim 1, wherein said air flow adjuster comprises a bypass connected between said supercharger air intake and said supercharger air outlet; and
    a bypass controller for controlling air flow through said supercharger and thereby controlling said air pressure at said supercharger outlet.

3. The hybrid system of claim 2, wherein said bypass controller includes a movable valve in said bypass to regulate air flow through the bypass.

4. The hybrid system of claim 3, wherein said bypass controller further includes a flow amount meter for measuring air flow at said supercharger inlet.

5. The hybrid system of claim 3, wherein said bypass controller further includes a supercharger rotating speed sensor.

6. The hybrid system of claim 1 wherein said airflow adjuster includes means for maintaining a substantially constant air flow volume to said engine inlet.

7. The hybrid system of claim 6, wherein said airflow adjuster further includes means limiting the pressure of air supplied to said engine inlet to a value which does not exceed engine maximum pressure limits.

8. The hybrid system of claim 1, wherein said supercharger drive shaft is coupled to said engine through an adjustable slip clutch.

9. The hybrid system of claim 1, wherein said supercharger drive shaft is coupled to said engine through a continuously variable transmission.

10. The hybrid system of claim 1, wherein said supercharger is coupled to said engine through a differential gear mechanism.

11. The hybrid system of claim 1, wherein said air flow adjuster includes a controller valve in the supercharger outlet, said controller valve being adjustable to control the air pressure supplied to said turbocharger by said supercharger.

12. The hybrid system of claim 11, wherein said controller valve is connected in the supercharger outlet to vary the rotating speed of the supercharger.

13. A hybrid supercharger system for an engine, comprising:

a turbocharger having a turbine connectable to receive exhaust gases from an engine and having a compressor having an air inlet and a pressurized air outlet connectable to an engine air intake, said turbocharger being capable of producing a maximum compressor output;

a volume type supercharger having an air intake for receiving ambient air and having an air outlet for producing pressurized air, said supercharger air outlet being connected to said turbocharger air inlet to supply pressurized air to the turbocharger;

an air flow adjuster connected to said supercharger for controlling the air pressure at said supercharger outlet; and sensors responsive to an engine connected to said turbocharger for controlling said air flow adjuster to cause said supercharger to change the pressure of the air supplied by said turbocharger in inverse proportion to the speed of the engine and to maintain the air flow volume from said turbocharger outlet substantially constant.

14. The supercharger system of claim 13, wherein said turbocharger outlet is connected to an air inlet of a first engine, and wherein said air adjuster comprises a second engine connected to drive said supercharger.

15. The supercharger system of claim 13, wherein said air adjuster comprises a controllable air flow bypass around said supercharger.

16. The supercharger system of claim 13, wherein said air flow adjuster includes a controller valve in the supercharger outlet.

\* \* \* \* \*